United States Patent
Wu et al.

[11] Patent Number: 6,053,992
[45] Date of Patent: Apr. 25, 2000

[54] SHAPE MEMORY ALLOY SEALING COMPONENTS

[75] Inventors: Ming H. Wu, Bethel; L. McD. Schetky, Easton, both of Conn.

[73] Assignee: Memry Corporation, Brookfield, Conn.

[21] Appl. No.: 08/944,012

[22] Filed: Sep. 30, 1997

Related U.S. Application Data

[63] Continuation of application No. 08/568,062, Dec. 6, 1995, abandoned.

[51] Int. Cl.[7] ........................................ F16J 13/00
[52] U.S. Cl. .................... 148/402; 148/563; 420/417; 420/441; 220/201
[58] Field of Search ....................... 148/402, 426, 148/563; 420/417, 441; 220/201

[56] References Cited

U.S. PATENT DOCUMENTS

| | | | |
|---|---|---|---|
| 3,900,939 | 8/1975 | Greacen | 220/201 |
| 4,049,151 | 9/1977 | Schweiso | 220/201 |
| 4,424,865 | 1/1984 | Payton | 148/402 |
| 4,770,725 | 9/1988 | Simpson et al. | 148/402 |
| 5,362,141 | 11/1994 | Beck et al. | 148/563 |

FOREIGN PATENT DOCUMENTS 4-86368  3/1992  Japan.

*Primary Examiner*—George Wyszomierski
*Attorney, Agent, or Firm*—Perkins, Smith & Cohen; Jerry Cohen; Harvey Kaye

[57] ABSTRACT

A mechanism that uses the shape recovery of a shape memory alloy for sealing openings or high pressure passages. A component made of a shape memory alloy can be processed in its martensitic state to have a reduced dimension smaller than that of the opening or the passage to be sealed. Upon heating, shape recovery takes place which is associated with the reverse crystalline phase transformation of martensite. The shape recovery of the previously processed shape memory alloy component yields a diameter which is greater than that of the opening or passage to be sealed. The shape recovery provides the dimensional interference and force required for sealing.

9 Claims, 6 Drawing Sheets

SHAPE MEMORY ALLOY SEALING COMPONENTS

CROSS-REFERENCE TO RELATED APPLICATIONS

This application is a continuation of U.S. application Ser. No. 08/568,062 filed Dec. 6, 1995, now abandoned.

FIELD OF THE INVENTION

This invention relates generally to the shape memory art, and more particularly, to couplings and the like made using shape memory materials.

BACKGROUND OF THE INVENTION

Metallic materials capable of being deformed and then of recovering their original shapes when heated are well established and are known as shape memory alloys. These alloys exhibit a reversible crystalline phase transformation from a high temperature phase of austenite to a low temperature phase of martensite. The temperature at which the transformation begins is referred to as $M_s$ while the finishing temperature of the transformation is referred to as $M_f$. The starting and finishing temperatures associated with the reverse transformation from martensite back to austenite on heating are referred to as $A_s$ and $A_f$, respectively. When these alloys are deformed at a temperature not far above the $A_f$ temperature, yielding occurs through the formation of stress induced martensite. Since martensite is mechanically unstable at these temperatures, it reverts back to austenite upon the release of deformation. As a result, it is possible to achieve elastic recovery of strains as great as 8%; this is referred to as "pseudoelasticity". Stress-induced martensite, and hence the deformation, can be stabilized by cooling. On the other hand, when shape memory alloys are deformed in their martensitic phase, the deformation proceeds by texturing the martensite crystalline along an orientation that is mechanically favorable to the deformation. In both cases, shape memory alloys retain the shape of deformed martensitic structure until subsequent reverse transformation on heating during which the alloy recovers its original shape. This thermally-induced shape recovery is termed "shape memory effect".

Both pseudoelasticity and shape memory effect have been observed in several alloy systems. Some of those considered to have commercial merits are NiTi, CuZnAl, CuAlNi, and their ternary, quaternary and higher order derivatives. These shape memory alloys, in particular NiTi based alloys, have found many commercial applications in, for example, thermal and electrical actuators, fluid pipe couplings, electrical connectors, orthodontic arch wires, and many other medical devices. These applications are reviewed in Shape Memory Alloy Applications by L. McDonald Schetky, in *Intermetallic Compounds* (chapter 26), Vol. 2, Practices, pp26.1–26.30, 1994, Edited by J. H. Westbrook and R. L. Fleischer, John Wiley & Sons, Ltd.

Depicted in FIG. 1 are two stress-strain curves of a shape memory alloy. Curve (1), typical in the vicinity of its phase transformation temperature, exhibits two stages of yielding with the first one related to stress-induced martensite transformation or texturing of existing martensite. Curve (2), typical at temperatures higher than $M_d$, the maximum temperature at which the martensite can be stress-induced, exhibits a conventional one stage yielding behavior. As in FIG. 2, the first yield stress ($\delta_y$) when plotted against temperature reaches a maximum at the $M_d$ temperature. Softening on cooling is attributed to the stress-induced transformation of martensite with ($\delta_y$) approaching a minimum at the $M_s$ temperature. Decreasing yield stress on heating above the $M_d$ temperature, on the other hand, is related to material softening at higher temperatures.

In applications such as fluid pipe couplings and various connectors, two mechanical elements are jointed together by the shape recovery of a shape memory alloy article. The strength of such a joint relies on the shape memory article to maintain its mechanical strength over the entire range of service temperature. As illustrated in FIG. 2, the service temperature of these applications is defined by the range where the yield strength of shape memory alloy exceeds a minimum requirement $\delta_m$, for maintaining proper mechanical integrity in these applications. This range of service temperature is bounded by a lower limit of $T_l$ and an upper boundary of $T_u$ in FIG. 2.

For military fluid couplings where the specification demands that the coupling be functional down to −55° C., a cryogenic alloy such as a NiTiFe alloy with $M_s$ temperature well below −55° C. is used (U.S. Pat. No. 4,035,007). The cryogenic NiTiFe alloy coupling is expanded at liquid nitrogen temperature (−196° C.). To prevent premature shape recovery, the deformed coupling must be stored and transported at a cryogenic temperature before installation. For convenience, it is preferable to use a shape memory alloy with its $M_s$ temperature at, for example, below −100° C., and its $A_s$ temperature above the maximum possible ambient temperature of storage and transportation, for example, 50° C.; i e., a wide transformation hysteresis of 150° C. Articles made of such an alloy can be processed, stored and transported at ambient temperature in the martensitic condition without the risk of premature shape recovery. During installation, heating would be applied to induce shape recovery; the process is referred to as "heat-to-recover".

Both CuZnAl and CuAlNi alloys have a hysteresis about 15–20° C. Near equiatomic binary NiTi alloys have a hysteresis about 30–40° C. The width of the hysteresis of NiTi based alloys can be manipulated by alloying. Adding copper to binary nickel-titanium alloy reduces the hysteresis to 10–20 ° C. (such as described in Cu-Content Dependence of Shape Memory Characteristics Ni—Ti—Cu alloys, by Nam et al, in Materials Transactions, Japan Institute of Metals, vol.31, No.11, pp. 959–967, 1990) while adding iron to the binary alloy widens the hysteresis to approximately 70° C. (as described in U.S. Pat. 3,753,700). However, a hysteresis of 70° C. is not sufficiently wide to realize the convenience of the heat-to-recover process. These alloys are still limited by cryogenic storage and installation in applications at subambient temperatures. It was recently disclosed in U.S. Pat. No. 4,770,725 that by adding niobium to binary nickel-titanium alloys, it is possible to obtain a cryogenic $M_s$ temperature together with a widened hysteresis. It was disclosed that in some copper based shape memory alloys, the hysteresis can be temporarily expanded by a "preconditioning" process consisting of mechanical and thermal processing (U.S. Pat. No. 4,095,999). It was also published that overdeforming a binary nickel-titanium alloy can temporarily shift both $A_s$ and $A_f$ to higher $A_s'$ and $A_f'$ temperatures (Miyazaki et al., Transformation Pseudoelasticity and Deformation Behavior in Ti-50.6 at. %Ni Alloy, Scripta Metallurgica, vol. 15, no. 3, pp. 287–292 (1981)). It was further disclosed in U.S. Pat. No. 4,631,094 that by mechanically preconditioning a nickel-titanium-niobium alloy, the reverse transformation temperatures after preconditioning, $A_s'$ and $A_f'$, can be shifted to a range above the ambient temperature, thereby making practical the heat-to-recover installation process. Preconditioned nickel-titanium-niobium alloys with widened hysteresis are used in heat-to-recover couplings and connectors (L.McD. Schetky, The Applications of Constrained Recovery Shape Memory Devices for Connectors, Sealing and Clamping, Proceedings of the First International Conference on Shape Memory and Superelastic Technologies, Pacific Grove, Calif. (1994)). These devices carry a common trade name of UniLok®. Heat-to-shrink UniLok® connector rings are also used for clamping a thin-walled can onto a base for packaging various electronic devices and at the same time providing a hermetic seal. The ring is especially attractive for attaching thin walled metal cylinders to bases of different materials, such as ceramics, plastics and dissimilar metals.

High pressure fluid passages, such as those in diesel fuel injectors, may experience operating pressures as high as 30,000 psi. To achieve even better efficiency of fuel combustion, next generation injectors may see even higher operating pressure than 30,000 psi. In order to machine internal high pressure fuel passages a hole must be bored in the outer injector body and after completion of the machining this hole must be sealed. The conventional method for sealing the opening after the machining operation is by brazing a steel plug into the hole. However, brazed plugs often have defects which are difficult to detect and may cause burst or fatigue failure in testing or in service. A more reliable sealing method which can withstand higher pressures and exhibits a longer fatigue life is therefore highly desirable. The present invention discloses an application of shape memory alloys for sealing a fluid or gas passage or opening capable of withstanding a wide range of operating pressures with a longer fatigue life.

BRIEF SUMMARY OF THE INVENTION

The shape memory sealing article of the present invention utilizes the shape recovery of a shape memory alloy to generate an interference seal to an opening or a passage. A shape memory alloy article with an initial dimension greater than that of the opening to be sealed is first deformed at temperatures below its $M_d$ temperature to a reduced dimension smaller than that of the opening. The deformed shape memory alloy article is then stored in its deformed state until installation. When installed, the shape memory article is properly placed in the opening and the temperature is raised to induce shape recovery. During the installation process, the shape memory article in trying to recover its original dimension, first fills up the installation gap and then generates stress at the contact surface to seal the opening. This sealing method has been shown to be capable of withstanding a wide range of pressures without failure.

Other objects, features and advantages will be apparent from the following detailed description of preferred embodiments taken in conjunction with the accompanying drawings in which:

DETAILED DESCRIPTION OF THE DRAWINGS

Figure 1:
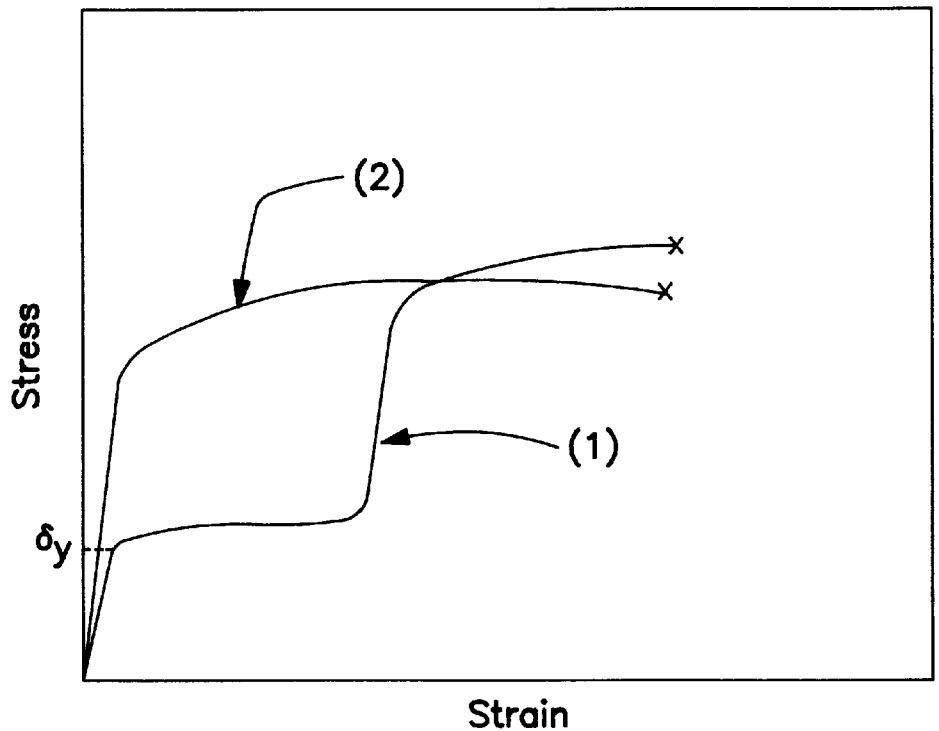
FIG. 1 is a graphical view showing schematically two stress-strain curves of a shape memory alloy.

In FIG. 1 there are two curves. Curve (1) is typical temperatures below the $M_d$ temperature where the martensite can be stress-induced or textured by deformation. Curve (2) is typical at temperatures above the $M_d$ temperature where the alloy exhibits conventional yielding behavior.

Figure 2:
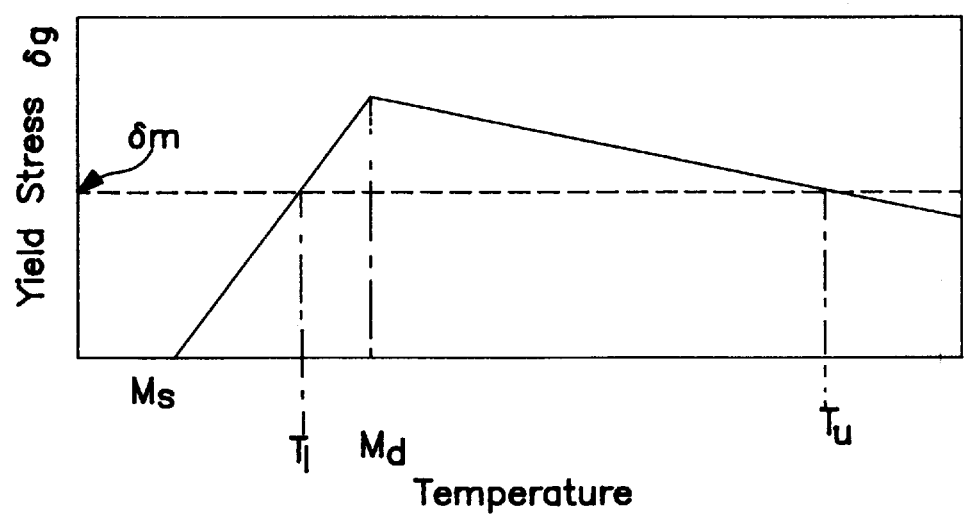
FIG. 2 is a graphical view showing a schematic plot of yield stress of a shape memory alloy as a function of temperature.

In FIG. 2, a curve is plotted of a mechanical component which is required to meet a minimum yield strength, $\delta_m$, and the operating temperatures are defined by a lower limit of $T_l$ and an upper limit of $T_u$.

Alloys exhibiting shape memory effect are applicable to the present invention. These alloys include but are not limited to Ni—Ti, Cu—Zn—Al, Cu—Al—Ni, Fe—Mn—Si, β Ti alloys such as Ti—Mo, Ti—V, and Ti—Nb, and their ternary or higher order derivatives including in particular Ni—Ti—Nb alloys which are preconditionable.

Figure 3:
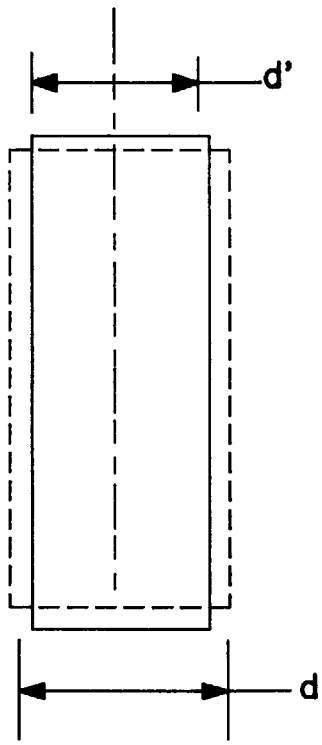
FIG. 3 is a schematic view of a shape memory plug with an original diameter d (dotted line), which is stretched to a reduced diameter of d' (solid line), and on heating, the stretched diameter d' recovers back to its original diameter d.
Figure 4:
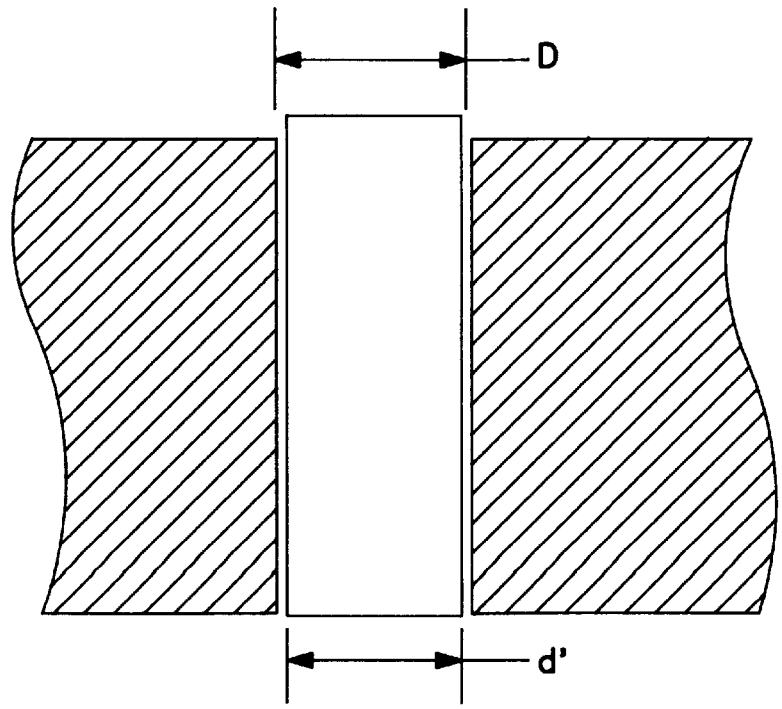
FIG. 4 is a side cross sectional schematic view illustrating an installation where a stretched plug of diameter d' is placed in a passage of diameter D to be sealed.
Figure 5:
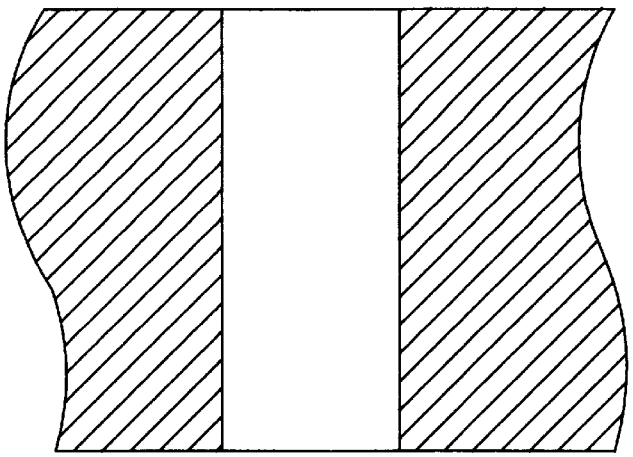
FIG. 5 is a cross sectional schematic view illustrating an installed plug sealing the passage after shape recovery.

As illustrated in FIG. 3, an SMA alloy, in this case, having the form of a cylindrical plug of diameter d (presented by dotted line), can be deformed by stretching or other means for reducing the diameter to d' (presented by solid line). Although this deformation can be carried out at temperatures below $M_s$ it is preferred that it be carried out at temperatures between $M_s$ and $M_d$ and finished at temperatures below $A_s$ (or $A_s'$ for alloys with the reverse transformation temperature shifted by preconditioning), such that the diameter d' is stable. The plug is then stored at temperature below $A_s$ or $A_s'$ until installation. During the installation the plug of diameter d' is placed inside an opening of diameter D which is larger than d' but smaller than d, as schematically illustrated in FIG. 4, and then the temperature of the plug is raised to induce shape recovery. Upon the completion of shape recovery, the plug expands in diameter and seals the opening with appropriate sealing force. A schematic illustration of the installation is shown in FIG. 5.

Figure 6:
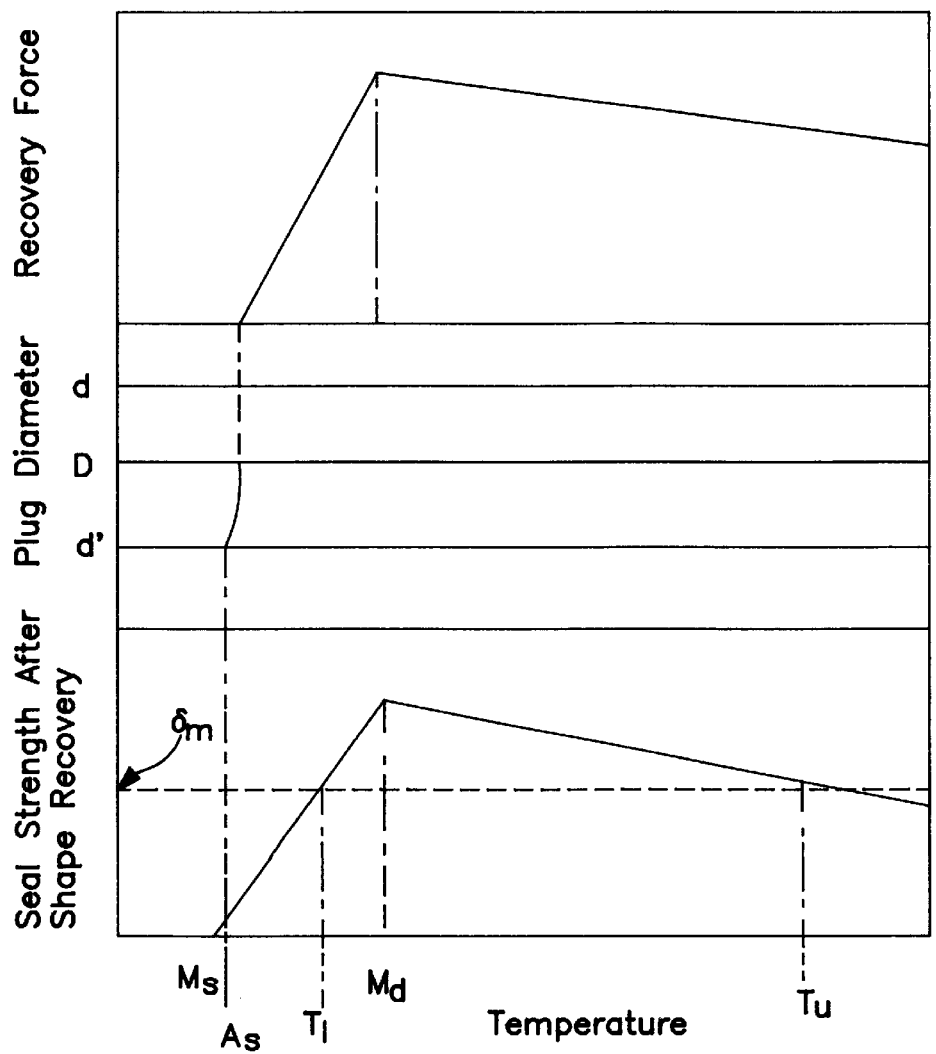
FIG. 6 is a graphical view schematically illustrating the diametral recovery, the recovery force and the strength of the seal after shape recovery for a shape memory alloy without preconditioning.

For a shape memory alloy sealing plug that can not be preconditioned, FIG. 6 describes schematically the diametral recovery, the recovery force of installation and the seal strength after installation in reference to the temperature. The plug diameter expands from d' to D upon heating to above the $A_s$ temperature. Assuming that the surrounding body to the opening is rigid such that little deformation occurs, no growth in plug diameter greater than the opening diameter D will occur; instead, stress will begin to build up when the plug diameter reaches D. Upon further increase in temperature, the contact stress will continue to increase until the plug completes the reverse transformation from martensite to austenite at a temperature around the $M_d$ temperature. After this installation process, the strength of the seal, as reflected by the pullout force of the sealing plug, will peak at the $M_d$ temperature and decreases on both cooling and heating as explained for FIG. 2. To meet the minimum sealing strength $\delta_m$, the operating range of the seal is again defined by the range bounded by $T_l$ and $T_u$. The limitation of such a shape memory alloy sealing plug is that the $A_s$ temperature usually lies below the $T_l$ temperature. For many applications requiring operation at subambient temperature, this limitation causes the inconvenience that the deformed plug needs to be processed. stored and transported at cryogenic temperatures to prevent premature shape recovery.

Figure 7:
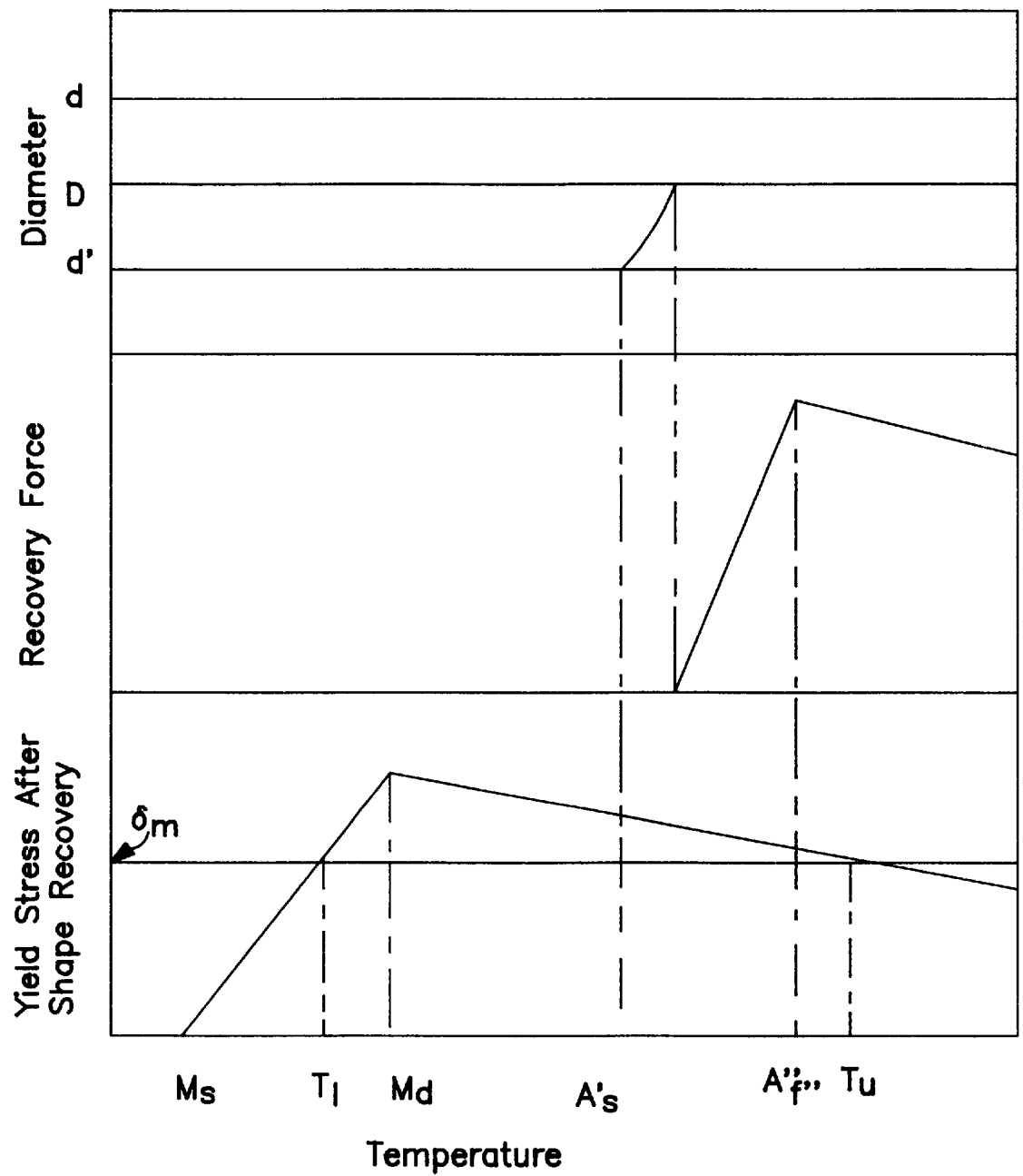
FIG. 7 is a graphical view schematically illustrating the diametral recovery, the recovery force and the strength of the seal after shape recovery for a preconditioned shape memory alloy.

For preconditioned shape memory alloy plugs with a wide hysteresis, such as those made of Ni—Ti—Nb alloy, the $A_s'$ temperature can be elevated to be above the $M_d$ temperature, as illustrated schematically in FIG. 7. Upon heating over the $A_s'$ temperature, the plug diameter, in trying to recover the original diameter d, expands from d' until reaching the opening diameter D. Again, assuming that the body surrounding the opening is rigid, stress will rise at contact interface upon further heating until the reverse transformation completes at a temperature $A_f''$. After the installation, the strength of the seal again reaches a maximum at $M_d$ and decrease with both cooling and heating. As with the other type of shape memory plug, the operating temperature of such seals are defined by the temperature range between $T_l$ and $T_u$. As can be understood from the schematic description in FIG. 7, the advantage of a preconditioned shape memory alloy plug is that the $A_s'$ temperature can be manipulated to be above the $T_l$ temperature. Even for applications that are required to function at cryogenic temperatures, a preconditioned shape memory alloy plug can be stored and transported at ambient temperature without the risk of premature shape recovery.

Figure 8:
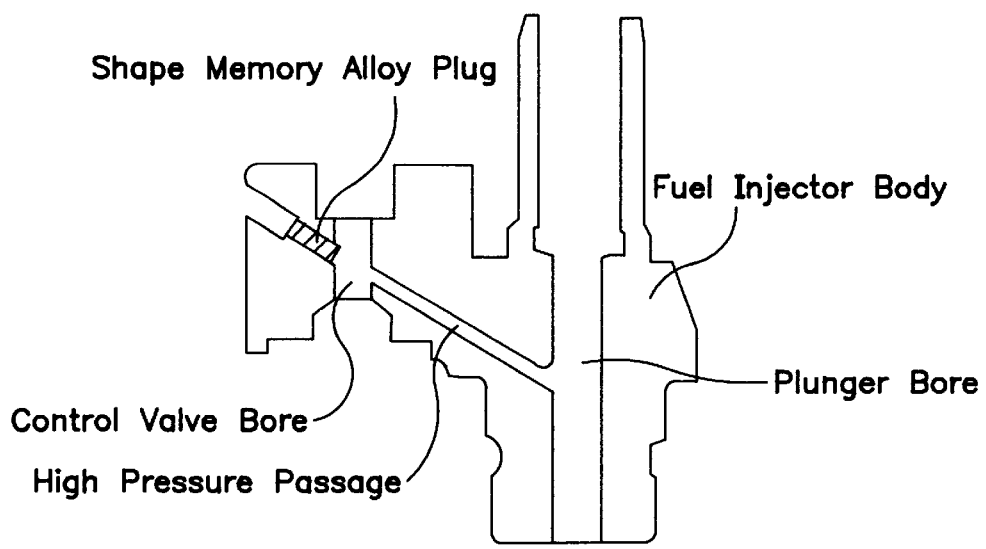
FIG. 8 is a schematic sectional view of a diesel fuel injector body with the machining opening sealed by a shape memory alloy plug.

An example of the present invention is the use of a preconditioned Ni—Ti—Nb alloy plug for sealing a machined opening in a fuel injector body. A cut-away sketch of a fuel injector is shown in FIG. 8. As illustrated in this sketch, a passage linking the plunger bore and the control valve bore is machined from the control valve side leaving an opening in the control valve body which needs to be sealed after machining. This passage is designed to pass high pressure fuel mixture from the control valve to the plunger bore. A pressure as 30,000 psi is common in the current design of many fuel injectors. The seal therefore must withstand 30,000 psi or higher operating pressure and be able to function in a wide range of operation temperatures typical for an automotive application. The ambient temperature in an arctic environment can be as cold as −55° C. while an automotive engine running in a steady state under most environments can reach 200° C. This is a sealing method where a Ni—Ti—Nb shape memory alloy, preconditioned by stretching to a reduced diameter with an $A_s'$ above the ambient, is cut to length and finished by centerless grinding to a plug of a final pre-recovery diameter smaller than the hole size. The plug is then used for sealing this opening in the fuel injector body by heat-to-recover installation process.

Figure 9:
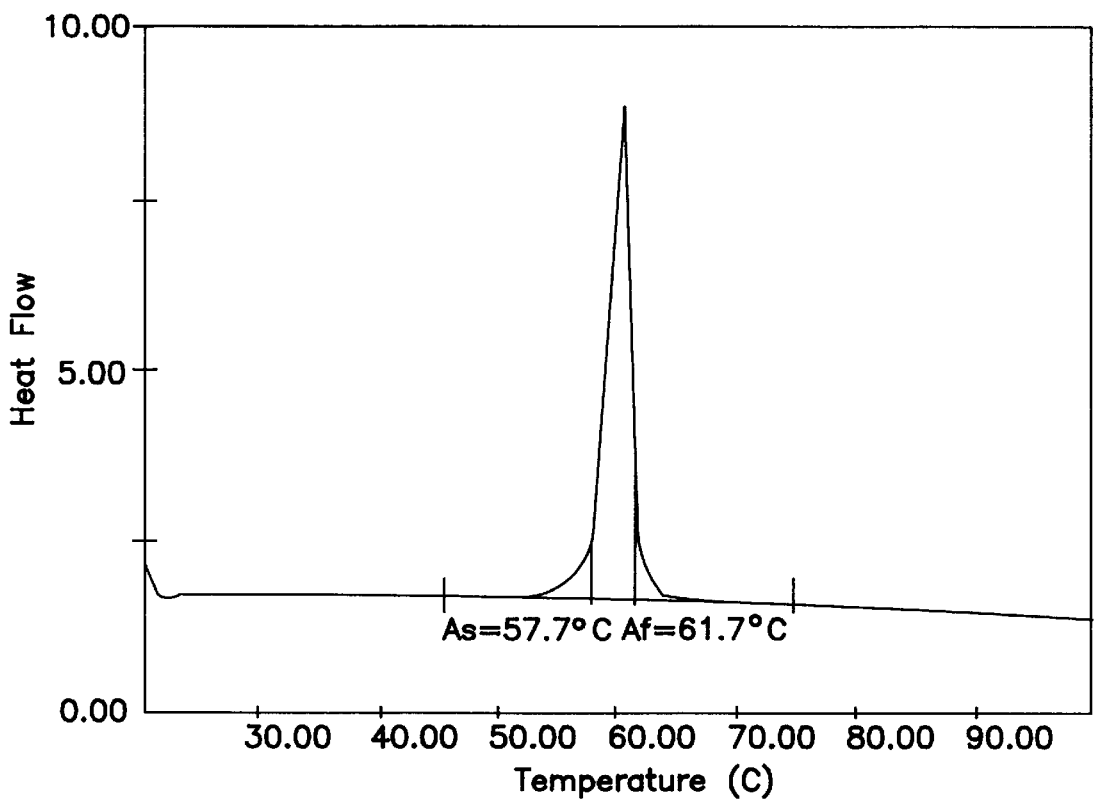
FIG. 9 is a thermograph of a Ni—Ti—Nb plug sample, measured by heating scan of a differential scanning calorimetry method.

The Ni—Ti—Nb alloy used in this example has a nominal composition of 48 weight percent Ni, 38 weight percent Ti and 14 weight percent Nb. Following the method described in U.S. Pat. Nos. 4,631,094 and 4,770,725, rods of this Ni—Ti—Nb composition were drawn, straightened, heat-treated and then preconditioned by stretching in the longitudinal direction to a reduced diameter of 0.120 inch. The rods were then cut to a length of 0.394 inch and centerless ground to finished diameters of 0.1140 inch and 0.1150 inch. Coolants were used in both cutting and grinding operations to prevent heating and shape recovery. The plugs after cutting and grinding exhibit thermal signals associated with the reverse phase transformation from martensite to austenite. An example of the heating scan thermograph measured by a differential scanning calorimety method is shown in FIG. 9, which indicates an $A_s'$ and an $A_f'$ of 57.7° C. and 61.7° C., respectively, as determined by a slope-intercept method. The dimensional recovery of sample plugs when measured at 20° C. ambient temperature before and after heating to 100° C. to induce free shape recovery is listed in Table 1. The diametral recovery is averaged at 2.7%. The 0.1150 inch diameter plugs were installed into the 0.116 inch diameter machined holes in the outer body of a fuel injector by heating the assembly to 200° C. The opening was properly sealed after heating. Subsequent testing proved that the seal successfully withstands an operating pressure of 45,000 psi.

TABLE 1

Dimension Recovery of Preconditioned Ni-Ti-Nb Plugs.

| Plug Number | Diameter (inch) | | Length (inch) | |
|---|---|---|---|---|
| | Before Heating | After Heating | Before Heating | After Heating |
| 1 | 0.1139 | 0.1170 | 0.4292 | 0.4059 |
| 2 | 0.1139 | 0.1170 | 0.4294 | 0.4070 |
| 3 | 0.1139 | 0.1170 | 0.4291 | 0.4064 |
| 4 | 0.1139 | 0.1170 | 0.4263 | 0.4039 |
| 5 | 0.1139 | 0.1170 | 0.4271 | 0.4044 |

Figure 10:
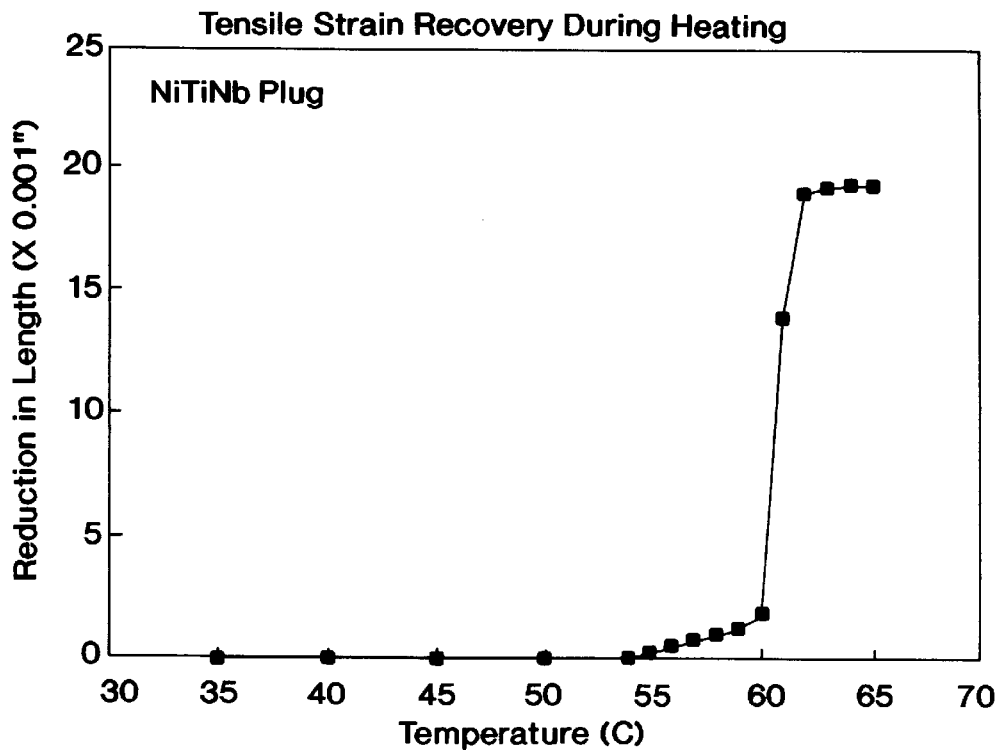
FIG. 10 is a graphical view showing the strain recovery curve.
Figure 11:
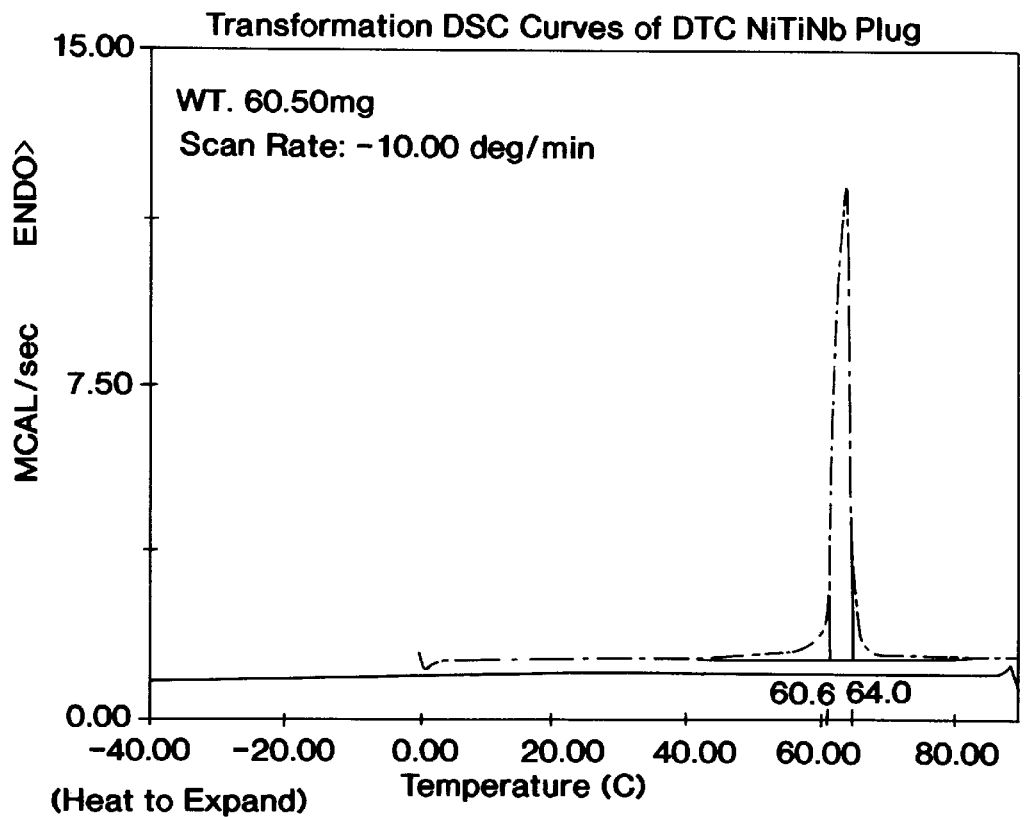
FIG. 11 is a graphical view showing the transformation thermograph measured by differential scanning calorimetry.

In a similar example, 25 NiTiNb plugs, in one example, each measuring 10.75 mm in length, 15 at 2.93 mm diameter and 10 at 2.915 mm diameter, with 4.5% recoverable tensile strain were fabricated according to the above described process. The strain recovery curve and the transformation thermograph measured by differential scanning calorimetry (DSC) are shown in FIGS. 10 and 11, respectively. The plugs were used to seal drilled holes of 2.95 mm in diameter. The seals were tested to pressure as high as 45 Ksi with no failure.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

We claim:

1. A sealing mechanism for an opening, comprising a solid, cylindrical shape memory alloy plug deformed by tensile elongation to have a diameter sufficiently smaller than an opening subject to high pressures up to 45,000 psi in which it is intended to be installed at temperatures below its reverse transformation temperature, $A_s$ or $A_s'$, so that upon heating it recovers to a dimension greater than that of the opening such that an interference fit is created for sealing the opening against high pressures, said shape memory alloy sealing plug in its deformed state being capable of being stored at cryogenic temperatures below its $A_s$, temperature until installation, and said plug being made of Ni—Ti—Nb.

2. A sealing mechanism for an opening, comprising a solid, cylindrical shape memory alloy plug deformed by tensile elongation to have a diameter sufficiently smaller than an opening subject to high pressures up to 45,000 psi in which it is intended to be installed at temperatures below its reverse transformation temperature, $A_s$ or $A_s'$, so that upon heating it recovers to a dimension greater than that of the opening such that an interference fit is created for sealing the opening against high pressures, said plug exhibiting a reverse transformation temperature which is capable of being altered by a mechanical deformation in its martensitic state, and thus imparting to it a widened transformation hysteresis until installation, and the plug in its deformed state being capable of being stored, transported and further processed at temperatures higher than its original $A_s$ temperature but lower than its preconditioned $A_s'$ temperature until installation, the preconditionable shape memory alloy being Ni—Ti—Nb.

3. A scaling mechanism for an opening, comprising a solid, cylindrical shape memory alloy plug deformed by tensile elongation to have a diameter sufficiently smaller than an opening subject to high pressures up to 45,000 psi in which it is intended to be installed at temperatures below its reverse transformation temperature $A_s$ or $A_s'$, so that upon heating it recovers to a dimension greater than that of the opening such that an interference fit is created for sealing the opening against high pressures, said plug exhibiting a reverse transformation temperature which is capable of being altered by a mechanical deformation in its martensitic state, and thus imparting to it a widened transformation hysteresis until installation, and the plug in its deformed state being capable of being stored, transported and further processed at temperatures higher than its original $A_s$ temperature but lower than its preconditioned $A_s'$, temperature until installation, said plug being of a Ni—Ti—Nb alloy for sealing a high pressure longitudinal opening in a fuel injector body subject to high pressures with its reverse transformation temperature $A_s'$ capable of being shifted to temperatures above the ambient temperature such that the deformed plug is capable of being stored, transported or further processed at ambient temperatures before the installation of the sealing plug in the fuel injector body opening.

4. A sealing assembly for closing a longitudinal opening and subject to high pressures up to 45,000 psi, comprising a solid cylindrical plug of an NiTiNb shape memory alloy deformed prior to installation to have a diameter sufficiently smaller than the opening into which it is placed, at temperatures below its preconditioned reverse transformation temperature, $A_s$ or $A_s'$, that has been heated and said plug having recovered a diameter greater than that of the opening such that an interference fit is created for sealing the opening against high pressure.

5. A sealing assembly for closing a longitudinal opening subject to high pressures according to claim 4, wherein the shape memory alloy solid cylindrical sealing plug prior to installation exhibits a reverse transformation temperature which can be altered by a preconditioning process, and said plug in its deformed state is capable of being stored at cryogenic temperatures below its $A_s'$ temperature prior to installation.

6. A sealing assembly closing a longitudinal opening according to claim 5, wherein the shape memory cylindrical plug is originally formed of a diameter larger than the diameter of the opening to be sealed, the plug is reduced in diameter to a size sufficiently smaller than that of the opening to be sealed while it is in a martensitic state by tensile elongation, and, when ready to be used to seal the opening the plug is heated to change its metallurgical state from martensitic to austenitic so that the plug undergoes shape recovery and increases in diameter to form a sealing engagement with the walls of said opening.

7. A sealing assembly closing a longitudinal opening in a diesel fuel injector according to claim 4, wherein said shape memory alloy sealing plug has been pre-strained to a smaller diameter by tensile elongation, exhibits a reverse transformation temperature which can be altered by a preconditioning process which imparts to it a widened transformation hysteresis, and the plug in its deformed state is capable of being stored, transported and further processed at temperatures higher than its original $A_s$ temperature but lower than its preconditioned $A_s'$ temperature until installation.

8. A sealing mechanism according to claim 7, wherein the Ni—Ti—Nb plug for sealing a high pressure opening in a fuel injector body and has a reverse transformation temperature $A_s'$ capable of being shifted to temperatures above the ambient temperature such that the deformed plug can be stored, transported or further processed at ambient temperatures before the installation of the sealing plug in the fuel injector body opening.

9. A sealing mechanism for a chamber subject to high pressure and having a longitudinal opening, comprising means defining a chamber subject to high pressure and having a longitudinal opening having a length greater than its diameter, said opening also being subject to high pressure; a shape memory solid, cylindrical alloy plug of Ni—Ti—Nb having a longitudinal dimension greater than its diameter and deformed by tensile elongation prior to installation to have a diameter sufficiently smaller than the diameter of the longitudinal opening it is intended to seal at temperatures below its reverse transformation temperature, $A_s$ or $A_s'$, so that upon heating, it recovers to a diameter greater than that of the longitudinal opening, such that an interference fit is created for sealing the opening to withstand high pressures of 45,000 psi, said shape memory alloy sealing plug exhibiting a reverse transformation temperature which has been altered by a process which imparts to it a widened transformation hysteresis, and the plug in its deformed state being capable of being stored, transported and further processed at temperatures higher than its original $A_s$ temperature but lower than its preconditioned $A_s'$ temperature until installation, the solid cylindrical Ni—Ti—Nb plug being subsequently diametrically expanded as shape recovery on heating to create an interference fit for sealing the high pressure opening so it will withstand high pressures of up to 45,000 psi.

* * * * *